United States Patent [19]

Tokita

[11] Patent Number: 4,641,252
[45] Date of Patent: Feb. 3, 1987

[54] ELECTRON BEAM DRAWING CONTROL SYSTEM

[75] Inventor: Masakazu Tokita, Numazu, Japan

[73] Assignee: Toshiba Kikai Kabushiki Kaisha, Tokyo, Japan

[21] Appl. No.: 405,982

[22] Filed: Aug. 6, 1982

[30] Foreign Application Priority Data

Oct. 1, 1981 [JP] Japan ................................ 56-156641
Oct. 22, 1981 [JP] Japan ................................ 56-169328

[51] Int. Cl.⁴ ............................................. G06F 15/00
[52] U.S. Cl. .................................................. 364/518
[58] Field of Search ................ 364/200, 900, 518, 491

[56] References Cited

U.S. PATENT DOCUMENTS

| | | | |
|---|---|---|---|
| 4,122,530 | 10/1978 | Smith et al. | 364/900 |
| 4,280,186 | 7/1981 | Hidai et al. | 364/518 |
| 4,387,433 | 6/1983 | Cardenia et al. | 364/200 |
| 4,433,384 | 2/1984 | Berrian et al. | 364/490 |

Primary Examiner—Gareth D. Shaw
Assistant Examiner—John G. Mills
Attorney, Agent, or Firm—Cushman, Darby & Cushman

[57] ABSTRACT

An electron beam drawing control system has a first memory which stores parameters specifying figures representing a pattern to be drawn in a number of cells. A figure generating device reads out parameters representing each figure sequentially from the first memory and generates dot pattern data corresponding to the figures. A second memory stores dot pattern data generated by the figure generating device. A read control device transforms dot pattern data stored in the second memory into serial form and supplies the serial data to an electro-optical device. The figure generating device includes a plurality of dot pattern converting devices. Also, the dot pattern data for each cell as generated by the dot pattern data converting units are stored in separate cell memories of the second memory.

16 Claims, 16 Drawing Figures

CNTAR { | NEXT MEM | REVERSING READING OF ADDRESS REVERSING DRAWING | | | | |
|---|---|---|---|---|---|---|
| 0 | 1 | 2 | ooo | ooo | 30 | 31 |
| 32 | 33 | 34 | oo | ooo | 62 | 63 |
| 64 | | | | | | |
| o | o | o | o | | | |
| o | o | o | o | | | |
| o | o | o | | | | |
| o | o | o | | | | |
| o | o | | | | | |
| | | | | | | 16384 |

MEMORY CELL 314, 316, 318, 320, 322, 324

FIG. 13

BT (BANK TABLE)

| CELL DATA NO. | SELECTION ORDER OF CELL MEMORIES 314-324 |
|---|---|
| ① | 314 |
| ② | 316 |
| ③ | 318 |
| ④ | 320 |
| ⑤ | 322 |
| ⑥ | 324 |
| ⑦ | 314 |
| ⑧ | 316 |

BT (BANK TABLE)

| CELL DATA NO | SELECTION ORDER OF CELL MEMORIES 314-324 |
|---|---|
| ① | 320 |
| ② | 318 |
| ③ | 322 |
| ④ | 324 |
| ⑤ | 314 |
| ⑥ | 316 |
| ⑦ | 324 |
| ⑧ | 318 |

ELECTRON BEAM DRAWING CONTROL SYSTEM

BACKGROUND OF THE INVENTION

1. Field of the Invention

The present invention relates to an electron beam drawing system, and more specifically to an electron beam drawing control system of the raster scanning type which enables high speed drawing.

2. Description of the Prior Art

Figure 1:
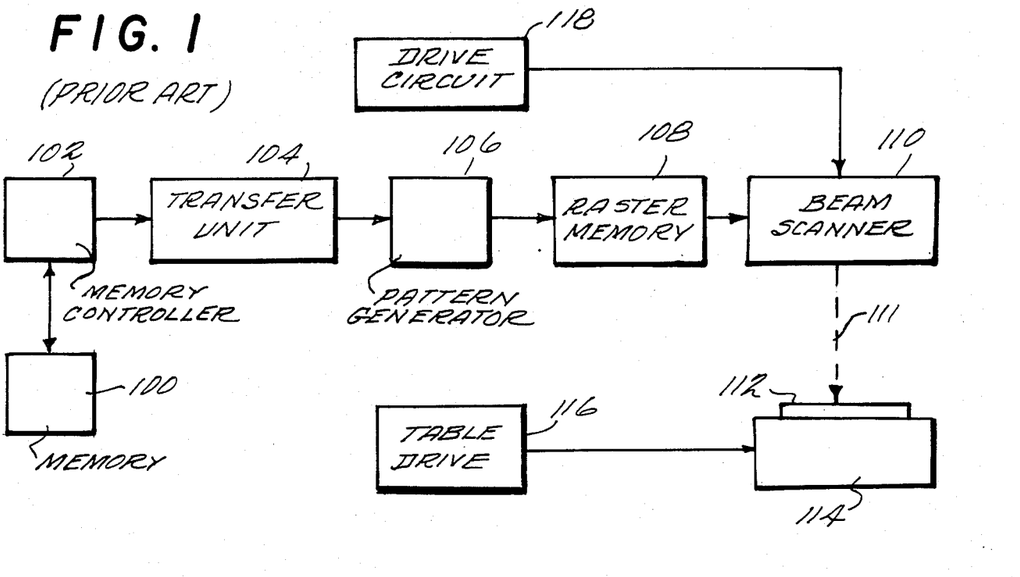
FIG. 1 is a general block diagram of a well known drawing control arrangement in a raster system.

FIG. 1 is a block diagram illustrating a general arrangement of a known raster scanning electron beam drawing control system.

In FIG. 1, a disc memory 100 stores condensed, parametric, data for a number of basic figures which may be drawn in basic drawing areas called cells. The condensed data is produced in advance from a whole pattern to be drawn.

A controller 102 controls the delivery of condensed data stored in disc memory 100 to a high speed data transfer unit 104.

A pattern generating unit 106 produces dot pattern data from the condensed data. Number 108 denotes a memory having memory units the size of cells for storing the dot pattern data delivered from pattern generating unit 106. Numeral 110 is an electro-optical device for directing electron beam 11 onto a sample 112 mounted on a table 114 which is moved by a table drive circuit 116. Numeral 118 is a drive circuit for operating electro-optical device 110.

Figures 2, 3:
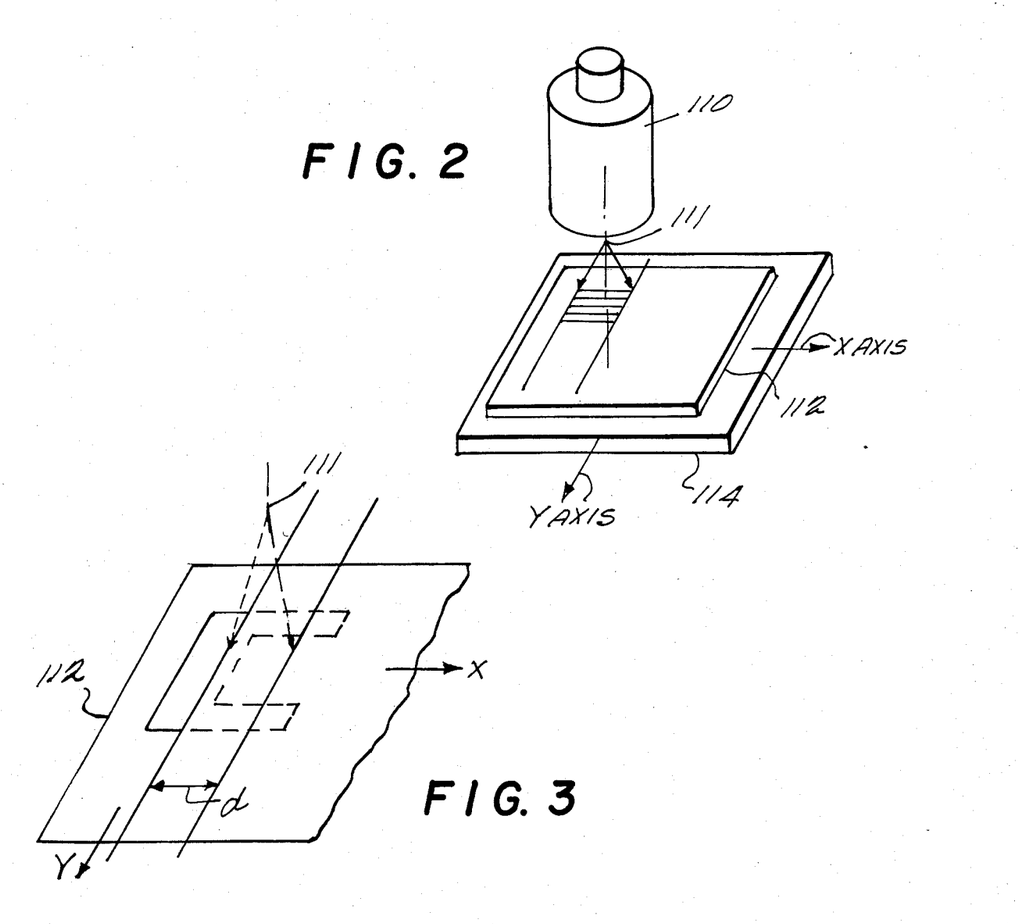
FIGS. 2 and 3 are illustrations explaining the drawing operation of an electron beam.

FIG. 2 illustrates the relationship between electron beam 111 emitted from raster scanning electro-optical system 110 and a sample 112 on Table 114. FIG. 3 is an enlarged and detailed perspective view of FIG. 2. As can be seen from FIGS. 2 and 3, electron beam 111 is deflected across the cell area which has a width "d" corresponding to 512 bits in the X direction of each cell. The electron beam is switched ON and OFF corresponding to a dot pattern during a single scan across the cell. Table 114 is adapted to move at a constant speed in the direction of Y such that after scanning in the Y direction, a subsequent scanning for the adjacent column proceeds.

Figure 4:
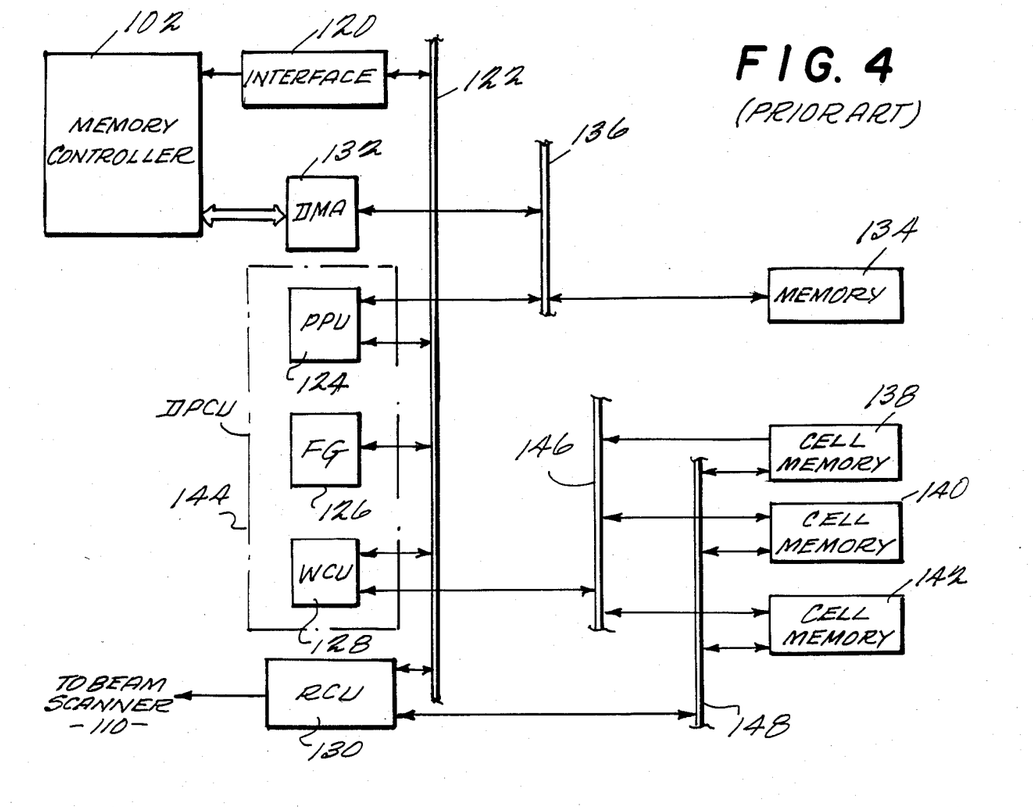
FIG. 4 is a block diagram showing in detail the conventional drawing control system.
Figure 5:
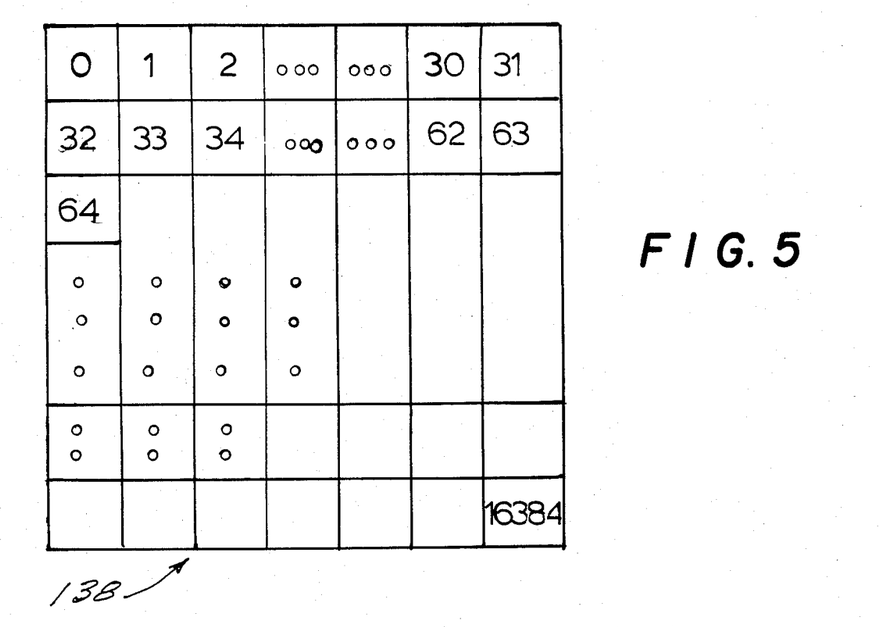
FIG. 5 is a chart showing the arrangement of addresses and data in the cell memory.

FIG. 4 is a more detailed block diagram of the conventional control system in FIG. 1. An interface 120 controls a pre-processing unit (PPU) 124, a function generator (FG) 126, a write control unit (WCU) 128, and a read control unit (RCU) 130 through control bus 122.

A high speed data transfer unit (DMA) 132 transfers a few units of condensed data to a data memory 134 through data bus 136. Each unit of condensed data for each cell is supplied through controller 102.

Pre-processing unit 124 receives condensed, parametric data DA identifying the shape and location of figures to be drawn (height, width, starting location, etc.) in a shortened notation from data memory 134 through data bus 136, and transforms the data so that it is suitable for function generator 126.

Function generator (FG) 126 generates raster blanking data for the electron beam from the above-mentioned compressed data DA. The blanking data includes the commands for activating or deactivating the electron beam, in addition to data related to the address at which the command is to be effected. Write control unit (WCU) 128 generates both addresses within cell memories 138, 140 and 142 and 16-bit blanking data corresponding to those addresses based on blanking data and address data given by function generator (FG) 126. The blanking data is written in the appropriate cell memory 138, 140 or 142 at the selected address. Each cell memory 138, 140 or 142 is organized to have 512 rows each with 32 bytes of 16 bits each (512 bits×512 bits). This corresponds exactly to the size of one cell.

PPU 124, FG 126 and WCU 128 will be referred to below as dot pattern converting unit (DPCU) 144 which transforms compressed data DA corresponding to figures to be drawn into blanking data. Read control unit 130 transforms blanking data from cell memories 138, 140 and 142 into serial data, and supplies the serial dot data to electro-optical system 110 in FIG. 1.

Data buses 146 and 148 connect cell memories 138, 140 and 142 to WCU 128 and RCU 130. RCU 130 reads out cell memories 138, 140 and 142 serially and cyclically. As data is being read from one cell memory, data is also being written into a different cell memory. For example, the cell memories are controlled such that writing in cell memory 140 occurs simultaneously with reading from cell 142, and writing in cell memory 140 by WCU 128 is completed at least before the contents of cell memory 142 are read by RCU 130. RCU 130 can thus transfer dot data smoothly with the three cell memories 138, 140 and 142.

Typically, data is transferred from RCU 130 to electro-optical system 110 at a speed of around 20 MHz at an electron beam spot diameter of $1\mu$. Recently, it has been desired to improve the resolution of display patterns by reducing the diameter of the electron beam spot to $0.5\mu$.

However, in order to display a line having the same width as the conventional one at the higher resolution, twice as many bits must be scanned as compared to the conventional case, which would require twice the time unless the scanning speed is doubled. Unless the speed is doubled, the drawing system would need to operate for 20 to 30 hours for a complicated drawing pattern.

In the control system shown in FIG. 4, it takes from 2 to 13 milliseconds for the dot pattern converting unit DPCU 144 to process data for one cell. Transferring condensed data from data memory 134 to DPCU 144 takes on the order of 2 to 3 microseconds, resulting eventually in a serial data transfer rate from RCU 130 limited to 20 MHz due to the relatively slow processing time by FG 126 and WCU 128 in DPCU 144.

SUMMARY OF THE INVENTION

The present invention increases the dot pattern data rate from the read control unit to the electron beam optical system in the conventional art described above, so that the scanning speed and therefore the drawing speed is increased. This is accomplished by providing a control system which includes multiplexed dot pattern converting units.

Incidentally, it should be noted that the structures of the PPU, FG and WCU are disclosed in detail in Japanese Patent Laid-open No. 55,9433 the contents of which are incorporated herein by reference.

DETAILED DESCRIPTION OF THE PREFERRED EMBODIMENTS OF THE INVENTION

Figure 6:
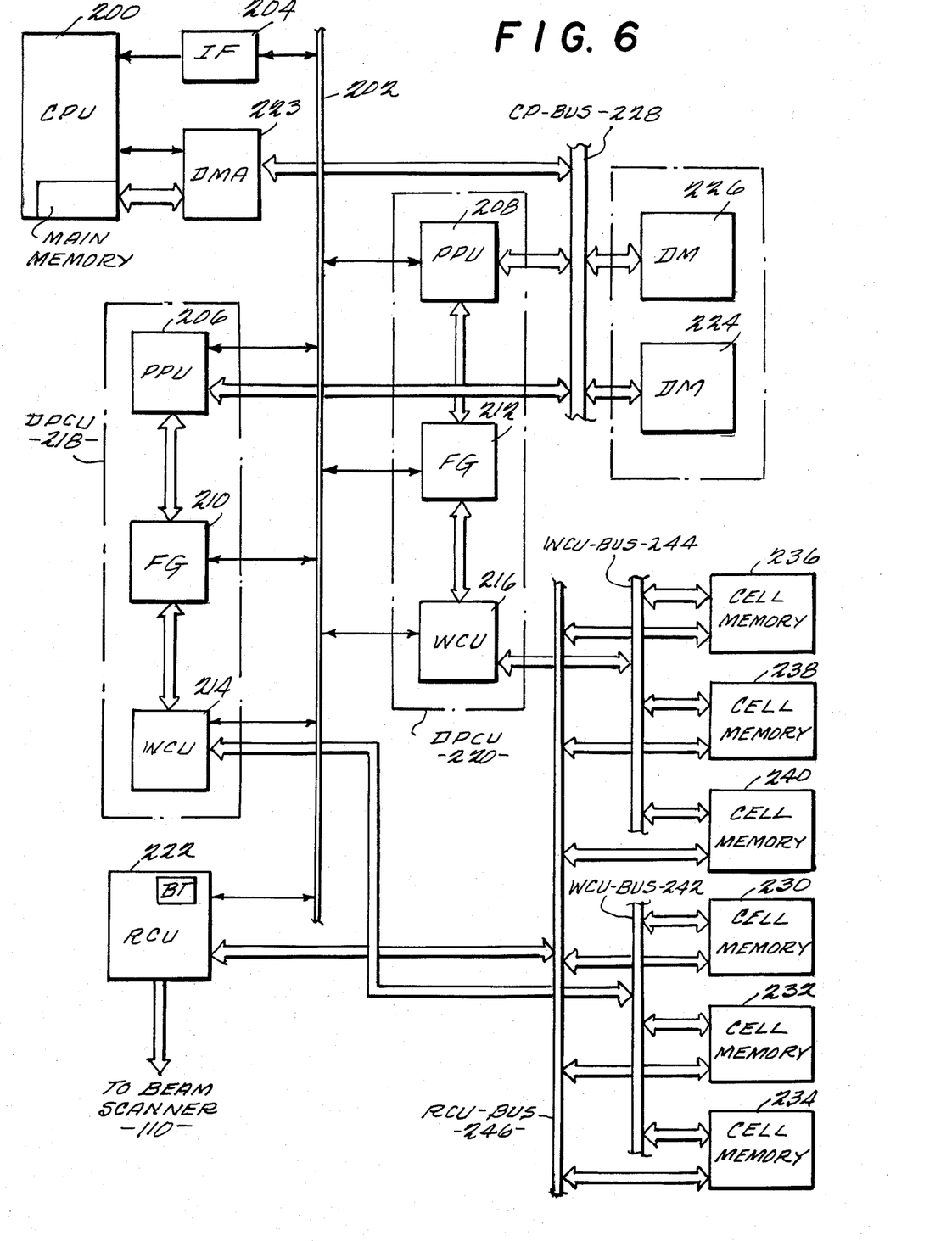
FIG. 6 is a block diagram embodying the drawing control system according to the present invention.

In FIG. 6, a controller 200 is provided with a control bus 202 through an interface 204, and the bus in connected to the respective pre-processing units (PPU) 206 and 208, function generators (FG) 210 and 212 and write control units (WCU) 214 and 216 of the dot converting units (DPUC's) 218 and 220. Control bus 202 is further connected to a read control unit (RCU) 222.

Direct memory access controller 224 causes condensed data DA, to be transferred from controller 200 to data memories 224 and 226 by CP-BUS 228. The dot pattern converting units 218 and 220 are also connected with data memories (DM) 224 and 226 through CP-BUS 228.

Write control units 214 and 216 are connected with cell memories 230, 232 and 234, and cell memories 236, 238 and 240 through WCU-BUS 242 and WCU-BUS 244, respectively.

Read control unit (RCU) 222 is connected with cell memories 230-240 through RCU-BUS 246.

In the foregoing arrangement, controller 200 controls DPCU's 218 and 220 through control bus 202 such that dot pattern data is delivered from DPCU 218 to the cell memory group including cell memories 230-234 and from DPCU 220 to the cell memory group including cell memories 236-240, alternately.

Although this embodiment illustrates that DPCU's 218 and 220 receive condensed data from the data memories (DM) 224 and 226, it is not necessary to limit the arrangement to this manner. Any arrangement may be made such that controller 200 regulates the timing of computation for the DPCU's 218 and 220 so that serial dot data is obtained from RCU 222 at a high transfer rate. The computation time for each cell largely depends on the number of basic figure patterns which lie in the cell, and thus the computation time for each cell is not constant. This nature can be utilized to maximize data flow flexibility. For exmaple, data may flow from DPCU 218 to cell memory 230, then from DPCU 218 to cell memory 232, DPCU 220 to cell memory 236, DPCU 218 to cell memory 234, and finally from DPCU 220 to cell memory 240. In this case, the order in whcih cell memories 230-240 are loaded is stored in controller 200, and RCU 222 reads out cell memories 230-240 in that order. In the Figure, RCU 222 has a bank table BT which receives from controller 200 and stores information concerning the order in which RCU 222 reads out the data stored in memories 230-240. For instance, the BT may include a 6 step counter and the information is given through bus 202 from CPU 200 to RCU 222 in advance or continuously.

In this embodiment, a pair of dot converting units are provided, and it is obvious that even higher speed reading is made possible by providing more dot converting units.

Figure 7:
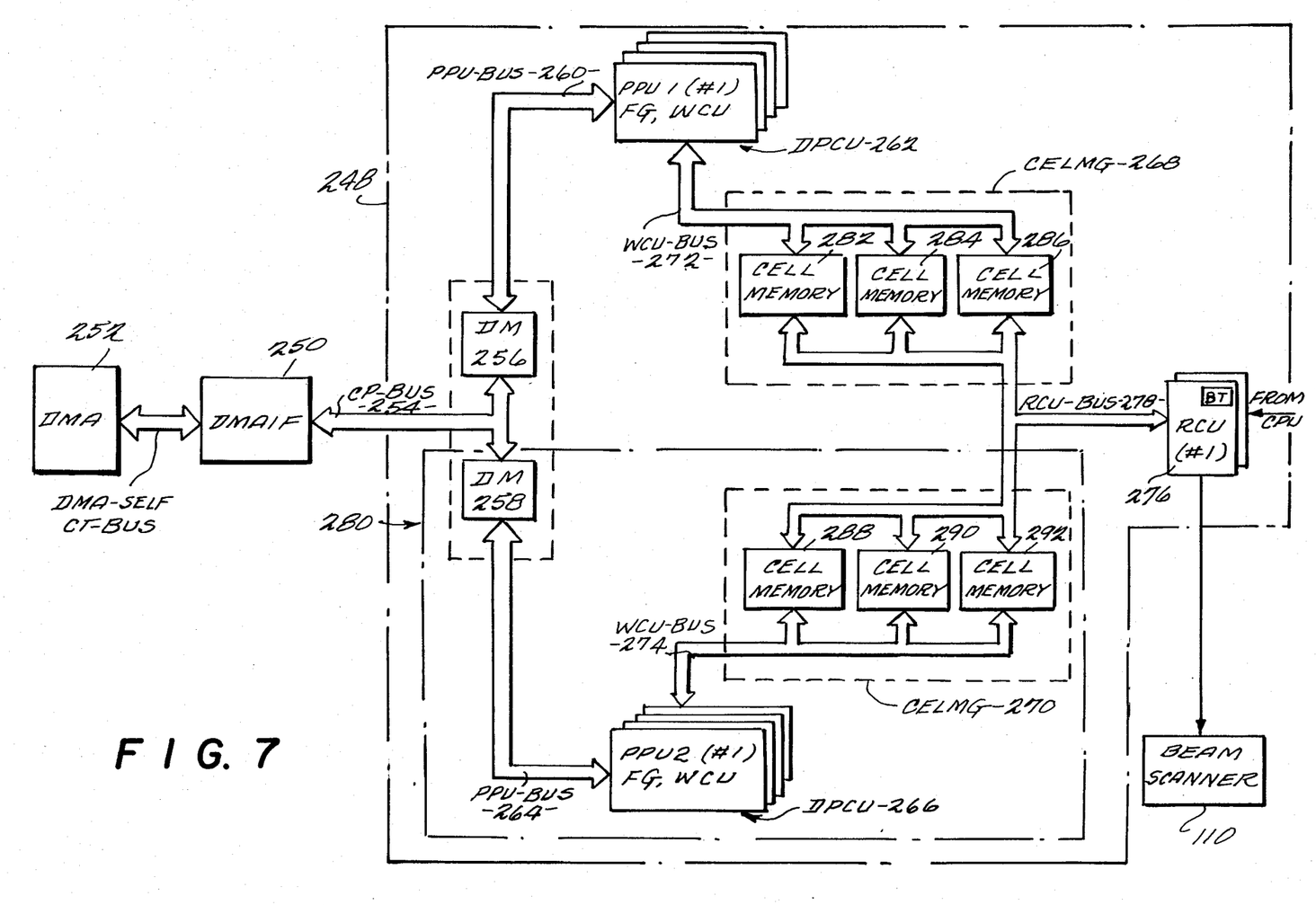
FIG. 7 is a block diagram showing another embodiment of the drawing control system according to the present invention.
Figure 8:
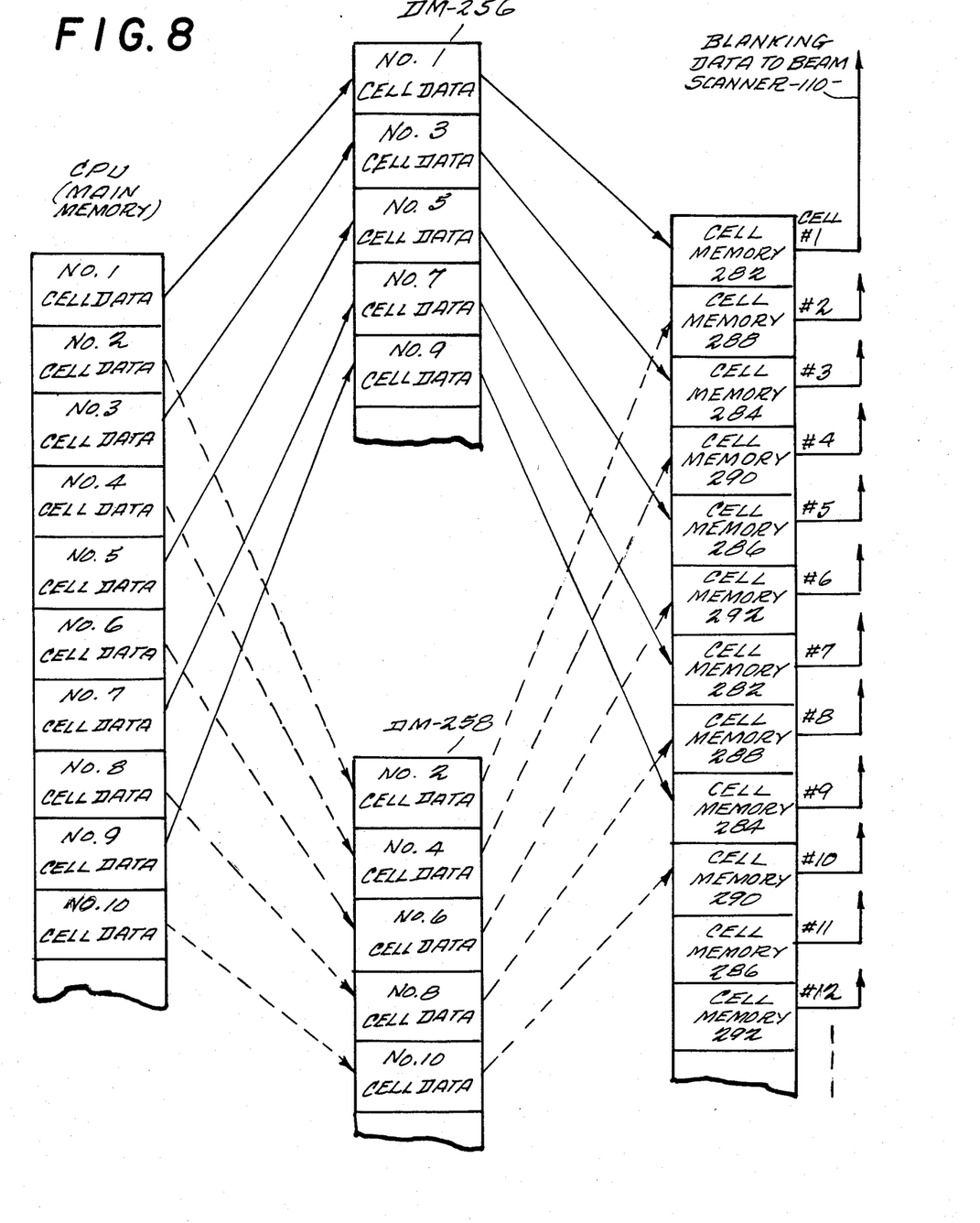
FIG. 8 is a chart showing the flow of cell data in the control system of FIG. 7.

FIGS. 7 and 8 show another embodiment of the present invention. FIG. 7 illustrates a block diagram of a circuit 248 for speeding up the drawing operation, and it is connected to a DMA interface (DMAIF) 250 extending from a Direct Memory Access (DMA) controller 252.

DMAIF 250 is connected through CP-BUS 254 to data memories 256 and 258. Memory 256 is further connected through PPU-BUS 260 to dot pattern converting unit 262 and memory 258 is further connected through PPU-BUS 264 to dot pattern converting unit 266. In the Figure, dot converting units 262 and 266 are each made up of four printed circuit boards (#1 through #4) each including a PPU, FG and WCU. Thus, each DPCU 262 and 266 may be considered as a system similar to that in FIG. 6, for example.

Dot pattern converting units 262 and 266 are connected to cell memory groups (CELMG) 268 and 270 through WCU-BUS 272 and WCU-BUS 274, respectively, and memory groups 268 and 270 are connected with each other and read control unit 276 through RCU-BSU 278. (In the Figure, RCU 276 includes two units #1 and #2). Serial dot pattern data from read control unit 276 is supplied to beam scanner 110 so as to perform the blanking control. Circuit 280 performs dot pattern conversion according to the present invention in a multiplexed fashion, having a connection between the CP-BUS 254 and RCU-BUS 278. Elimination of unit 280 and all but one printed circuit board of DPCU 262 (so that DPCU 262 has a single PPU, FG and WCU) result in the conventional display control circuit illustrated in FIG. 4. Since PPU-BUSes 260 and 264 are provided separately in this embodiment, DPCU's 262 and 266 are coupled to data memories 256 and 258 independently, and is advantageous for high speed operation as compared with the single CP-BUS system as shown in FIG. 6.

FIG. 8 is a chart explaining the data flow in the system of FIG. 7. In the figure, data for each cell, i.e., No. 1 cell data, No. 2, and so on, are transferred from the main memory of CPU 200 (in FIG. 6) to DMA 252. In this case, odd numbered cell data, such as No. 1, No. 3, No. 5, No. 7 and No. 9 are transferred to data memory 256, and even numbered cell data such as No. 2, No. 4, No. 6, and so on, are transferred to data memory 258 through DMAIF 250. Then, cell data No. 1, No. 3, No. 5, No. 7, and so on, in data memory 256 are converted to dot pattern data by dot pattern converting unit DPCU 262, and these converted pattern data are transferred to cell memories 282, 284 and 286 sequentially, repetitively and in this order.

Similarly, cell data No. 2, No. 4, No. 6 and so on, in data memory 258 are converted to dot pattern data by dot pattern converting unit 266, and these converted pattern data are transferred to cell memories 288, 289 and 282 sequentially, repetitively and in this order. Cell memories of both cell memory groups 268 and 270 store dot pattern data in the cell memories in the order of 282, 288, 284, 290, 286, and 292, sequentially, repetitively and in this order when observed in time serial fashion, and read control unit RCU 276 in FIG. 7 designates each cell memory in this order so as to read out dot pattern data. Accordingly, cell memories are read in the proper cell data order, i.e., No. 1, No. 2, No. 3, and so on.

In the foregoing embodiment in FIGS. 7 and 8, cell memories are read sequentially, and dot pattern converting units 262 and 266 are used alternately. Thus, the aim of the present invention is to ensure that cell data will be read out in the order in which cells are to be drawn in the raster scanning system. Furthermore, the dot pattern converting units may be used alternately or sometimes consecutively (i.e., randomly, depending on the length of time necessary to process data from a cell) in order to increase the drawing speed, i.e., the reading speed of serial data from the RCU. From this viewpoint, the order of designating cell memories cannot be defined as in the previous example since any empty memory cell can be employed. For example, when cell memories are addressed for storage in the order of DPCU 262-CP memory 282—DPCU 266-cell memory 290—DPCU 262-cell memory 286—DPCU 266-cell memory 288—DPCU 262-cell memory 284, and so on, CPU 200 memorizes this order and controls 276 RCU so that it reads out cell memories in that order.

This system is referred to as a random system. The random system is advantageous in that cell memories can be addressed arbitrarily even if dot pattern conversion for each cell data takes a different computation time.

Sequential systems and random systems may be combined appropriately. In the foregoing description, three cell memories are included in each group, and it is possible to increase the number when necessary. It is also possible to further enhance the drawing speed by provision of multiple sets of PPU, FG and WCU in each of the dot pattern converting units 262 and 266.

Figure 9:
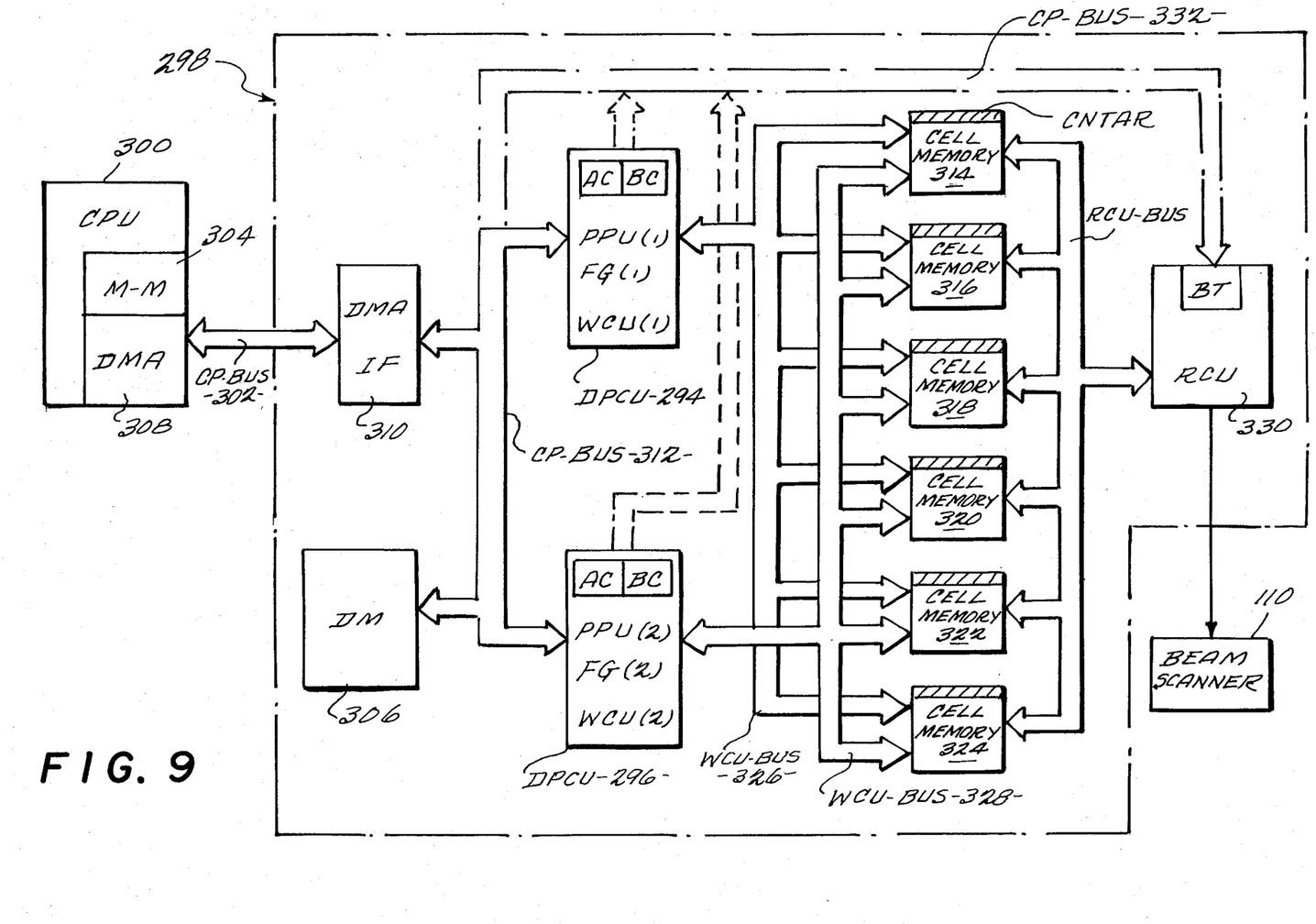
FIG. 9 is a block diagram of still another embodiment of the present invention in which each cell memory is provided with a control area.

FIG. 9 shows still another embodiment of the present invention and illustrates a block diagram embodying a drawing control system having two dot pattern data converting units 294 and 296. In FIG. 9, a drawing circuit 298 is connected to a controller CPU 300 through CP-BUS 302, and condensed data stored in a main memory (MM) 304 within controller CPU 300 is temporarily stored in a cell data memory 306 through DMA controller 308, CP-BUS 302, DMA interface 310, and CP-BUS 312. In FIG. 9, the control bus and data bus connecting each block are shown as a single common bus. CP-BUS 312 is connected with two dot pattern data converting units 924 and 296 and supplies cell data for computation to dot pattern data converting units 294 and 296.

DPCU's 294 and 296 are connected to cell memories 314-324 through write control buses (WCU-BUS) 326 and 328, and thus dot pattern data for each cell processed by DPCU's 294 and 296 are supplied by the above-mentioned buses WCU-BUS 326 and 328 and stored in an arbitrary one of cell memories 314-324. The dot pattern data stored in cell memories are transformed into serial data by read control unit 330, then supplied to beam scanner 110.

Figure 10:
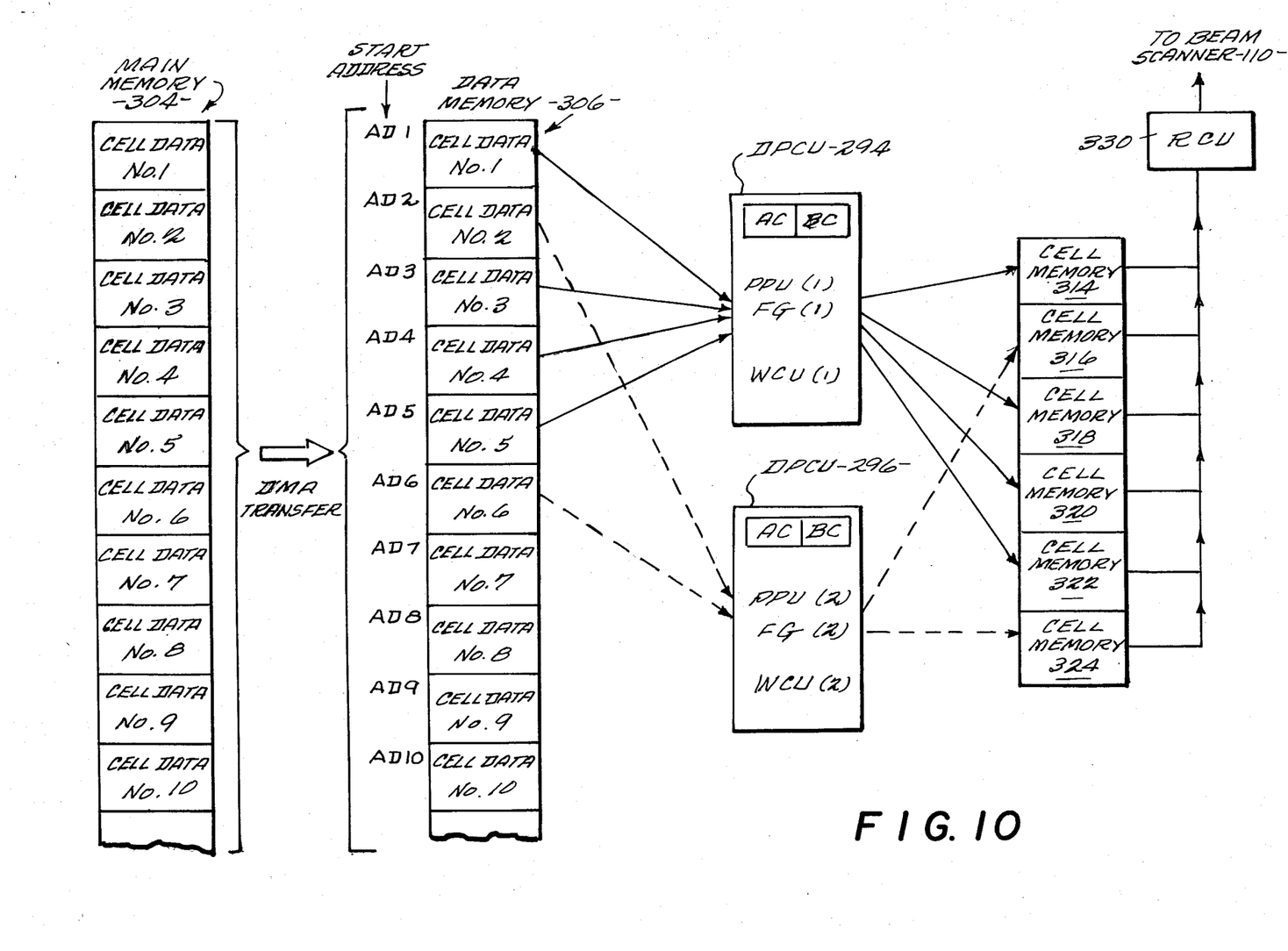
FIG. 10 is a chart showing in brief the process of data conversion by the drawing circuit of FIG. 9.

FIG. 10 illustrates a diagram showing the data flow from main memory 304 of CPU 300 to read control unit 330. In the Figure, cell data No. 1, No. 2 . . . No. 10 shown on the left are condensed, parametric data, and the number indicates the order of cells to be drawn. Each cell data in main memory 304 is transferred to and stored in data memory 306 by DMA transfer. AD1, AD2 and so on, as shown in the Figure, are the addresses at which the storage of data for the cells begins in memory 306.

On completion of data conversion for each cell, dot pattern data converting unit 294 or 296 transfers cell data to memories 314-324, then interrupts CPU 300. In response to the interrupt, CPU 300 causes cell data in data memory 306 to be transferred to the converting unit 294 or 296 which has issued the interrupt command.

DPCU's 294 and 296 are each provided wtih registers AC and BC. Registers AC store the starting address ADi of each cell data which is supplied from data memory 306 to DPCU's 294 and 296. Registers BC store a code identifying which of cell memories 314-324 is to receive dot pattern data from converting unit DPCU 294 or 296.

Data stored in registers AC and BC are delivered from CPU 300. Read control unit 330 sequentially reads out dot pattern data stored in cell memories 314-324, transforms the data into serial data, and supplies the serial data to beam scanner 110.

Various methods may be employed for ordering the reading of dot pattern data from cell memories 314-324. Dot pattern data must be read out from memories 314-324 in an order corresponding to the order of the cell data numbers No. 1, No. 2, No. 3 and so on in main memory 304 of CPU 300. Various procedures will be further described below.

Figure 11:
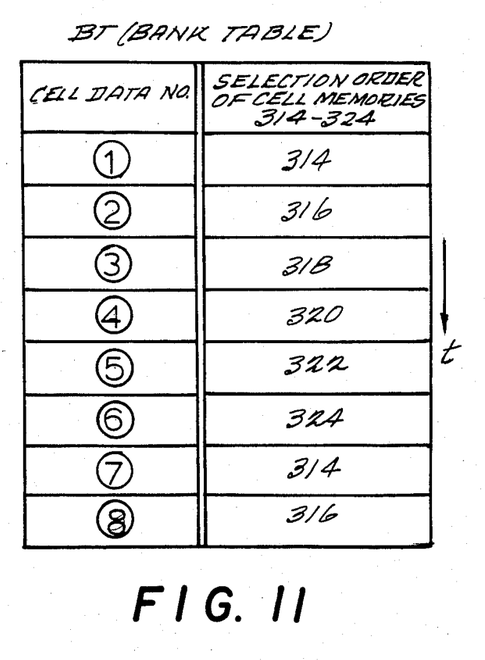
FIGS. 11 and 12 are illustrations showing 2 examples of the contents of a blank table.
Figure 12:
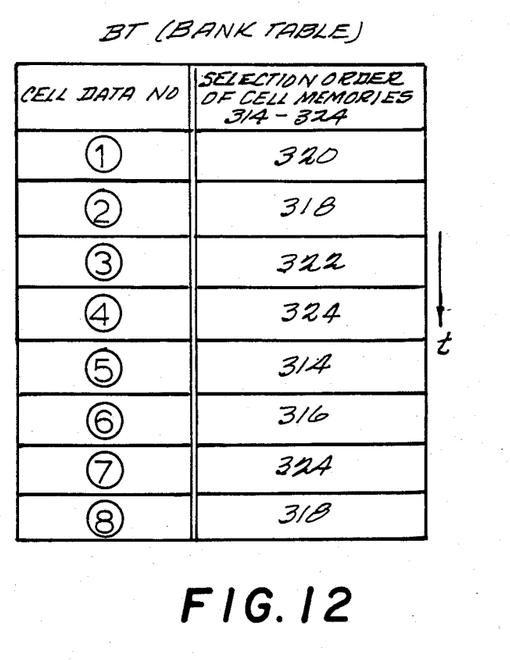

In a first method, when an interrupt command is issued by dot pattern data converting unit 294 or 296, CPU 300 causes to be stored in registers AC and BC of the interrupting DPCU both the head address of the next cell data to be read out from data memory 306 and which of cell memories 314-324 the dot pattern data will be directed to. When data for registers AC and BC are transmitted from CPU 300, these data are also stored via CP-BUS 332 (see FIG. 9) in bank table BT which functions as a register in RCU 330. FIGS. 11 and 12 show two sample contents of bank table BT with show the cell memory number corresponding to the cell data number given by CPU 300, and thus RCU 330 specifies the appropriate cell memory sequentially with reference to table BT so as to receive dot pattern data from the specified cell memory.

In a second method as shown in FIG. 9, the control area CNTAR of each cell memory 314-324 indicates the number of the next cell memory for storing data from dot pattern converting unit 294 or 296 subsequently to that cell memory. Accordingly, RCU 330 can specify cell memories sequentially by checking the number of the cell memory to be read out next in the control area CNTAR of each cell memory. In this example, the bank table BT and CP-BUS 332 are not required.

Figure 13:
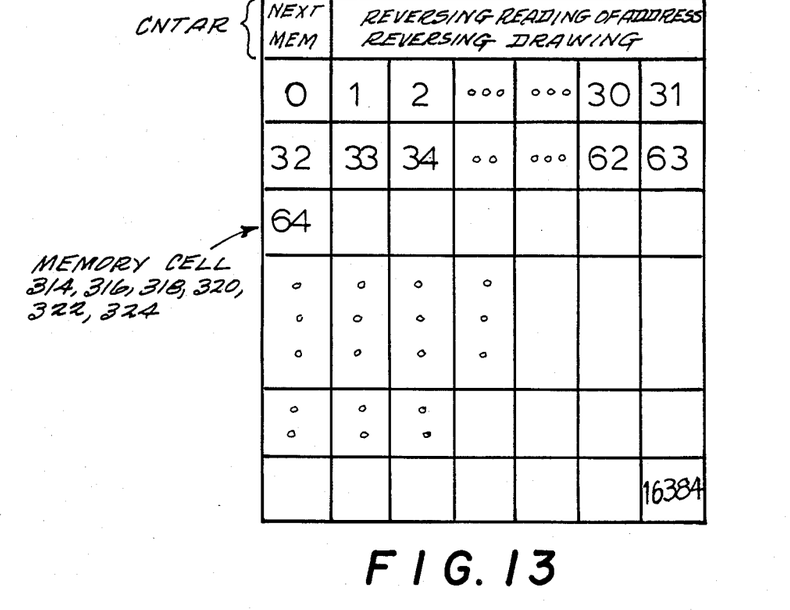
FIG. 13 is a chart showing the allocation of address, data and control area of a cell memory relating to FIG. 9 and FIG. 14.

In FIG. 13 there is shown a cell memory typical of cell memories 314-324 which is provided with a control area CNTAR in which the next memory cell to be read out, as well as specifications for reversing the reading of the cell memory address and reversing the areas of the drawing in which the electron beam is on and off can be stored.

A third method will be described with reference to FIG. 9. An arrangement may be made such that after computation by DPCU 294 or 296 has been completed, DPCU 294 and 296 checks and specifies a cell memory which has no dot pattern data just before the result of computation is transferred to one of cell memories 314-324. Numbers representing the empty cell memories are stored sequentially in the above-mentioned bank table BT, as shown by the dashed lines from DPCU 294 and 296 to CP-BUS 332. In this case, the load on CPU 300 can be reduced slightly compared with the first and second methods referred to above.

In a fourth method which does not employ bank table BT, DPCU 294 or 296 checks which of cell memories 314-324 is empty. It then writes in control area CNTAR of the cell memory just filled an indication of the cell memory to be filled next.

Figure 14:
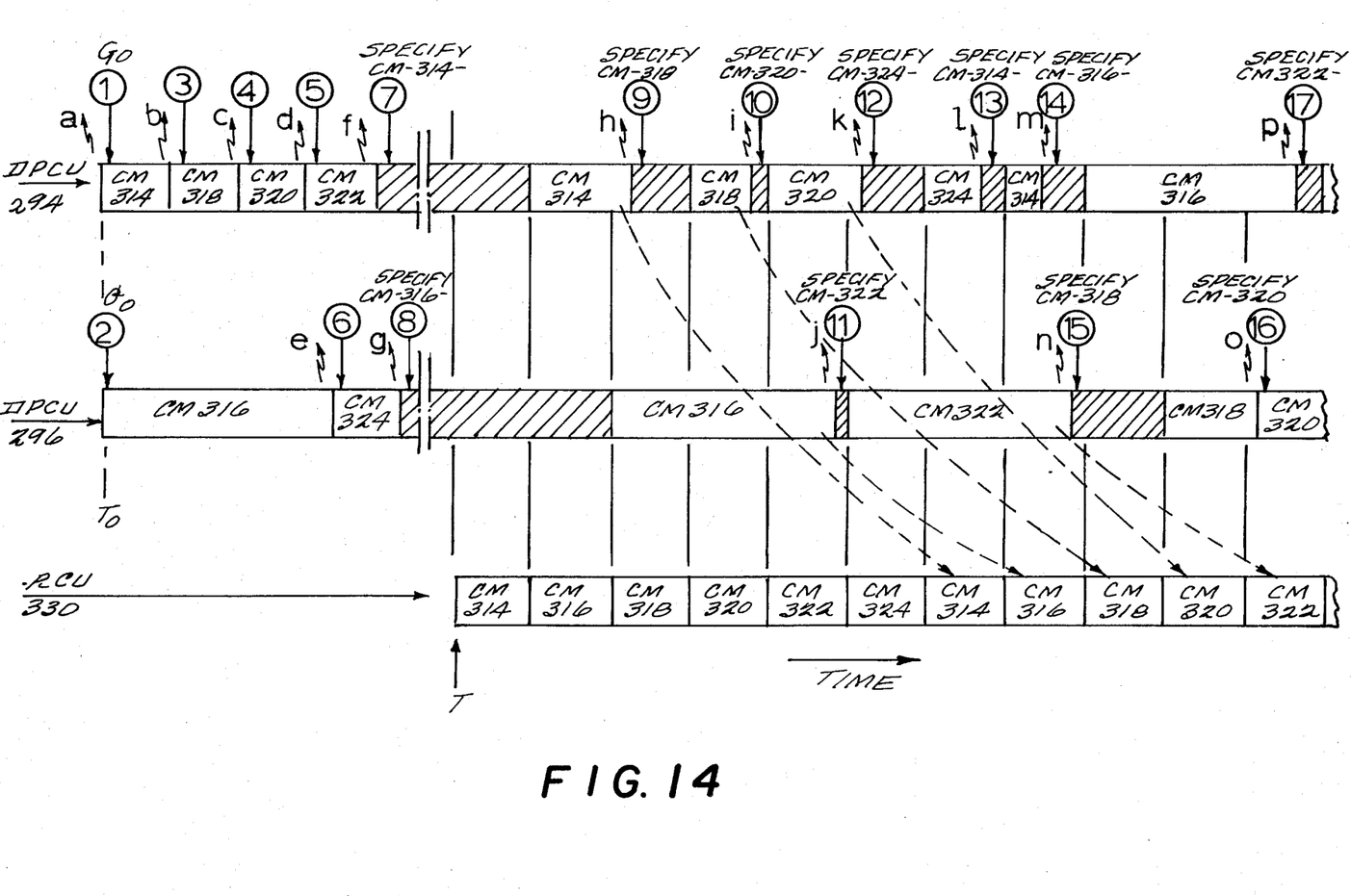
FIG. 14 is a timing chart explaining the processing relation between the CPU, dot pattern data converting unit and cell memories.

FIG. 14 is a timing chart illustrating the operation of CPU 300 in the foregoing first method.

The Figure shows the time interval during which dot pattern data converting units 294 and 296 and read control unit 330 interact with the specific cell memories. The hatched portions indicate a wait state.

Assuming that drawing begins at time T, DPCU's 294 and 296 have been computing dot pattern data to be stored in each cell memory, as shown in the Figure. In more detail, when cell data is to be stored in the cell memories in the pattern shown in FIG. 11, CPU 300 issues a GO command at time T0 in response to an interrupt command from DPCU 294 so that cell data 1 is given to DPCU 294. At the same time, CPU 300 stores an indication of cell memory 314 in register BC of DPCU 294, and gives register AC in DPCU 294 the start address indicating the address of data memory 306 where the data for cell 1 is stored. Subsequently, DPCU 294 converts the cell data 1 into dot pattern data. Also, CPU 300 directs DPCU 296 to compute data for cell 2. For this purpose, the CPU gives register BC in DPCU 296 an indication related to cell memory 316 for storing the data from cell 2 as dot pattern data.

As shown in the Figure, when DPCU 294 was processed cell data 1, an interrupt command b is given to CPU 300. Since data from cell 2 is being processed, CPU 300 sends data related to the address in data memory 306 of data for cell 3 and an indication related to cell memory 318 to registers AC and BC, respectively, so that DPCU 294 will process cell data 3. Similarly, on completion of the process for cell data 3, an interrupt command c is issued. Since DPCU 296 is still processing data from cell 2, CPU 300 gives DPCU 294 necessary data for processing cell data 4. On completion of processing for the cell data 4, an interrupt command d is issued. Since DPCU 296 is still processing cell data 2, cell data 5 is specified for DPCU 294.

Next, when an interrupt command e is issued before the processing for cell data 5 has been completed, CPU 300 directs DPCU 296 to process cell data 6.

Then, an interrupt command f is issued by DPCU 294 before processing for cell data 6 has completed, and CPU 300 specifies cell data 7 for DPCU 294. At this time, an indication for cell memory 314 is stored in register BC of DPCU 294. After that when an interrupt command g is issued, CPU 300 specifies cell data 8 for DPCU 296, and stores an indication of cell memory 316 in register BC of DPCU 296. Since dot pattern data to be drawn in stored in all cell memories 314-324, cell data 7 and 8 are not processed and the system awaits the start of drawing.

Drawing is started at time T and after RCU 330 has read dot pattern data from cell memory 314, DPCU 294 carries out processing for cell data 7, storing the results in cell memory 314.

When the contents of cell memory 316 have been completely outputted, DPCU 296 carries out processing for cell data 8 storing the results in cell memory 316. Next, when an interrupt command h is issued by DPCU 294, CPU 300 specifies cell data 9 for DPCU 294 to be stored in cell memory 318. Since cell memory 318 has not yet been completey read out, DPCU 294 waits. After completion of the reading process, cell data 9 is processed in DPCU 294. This process continues as shown. The time needed to draw each cell is identical.

Figure 15:
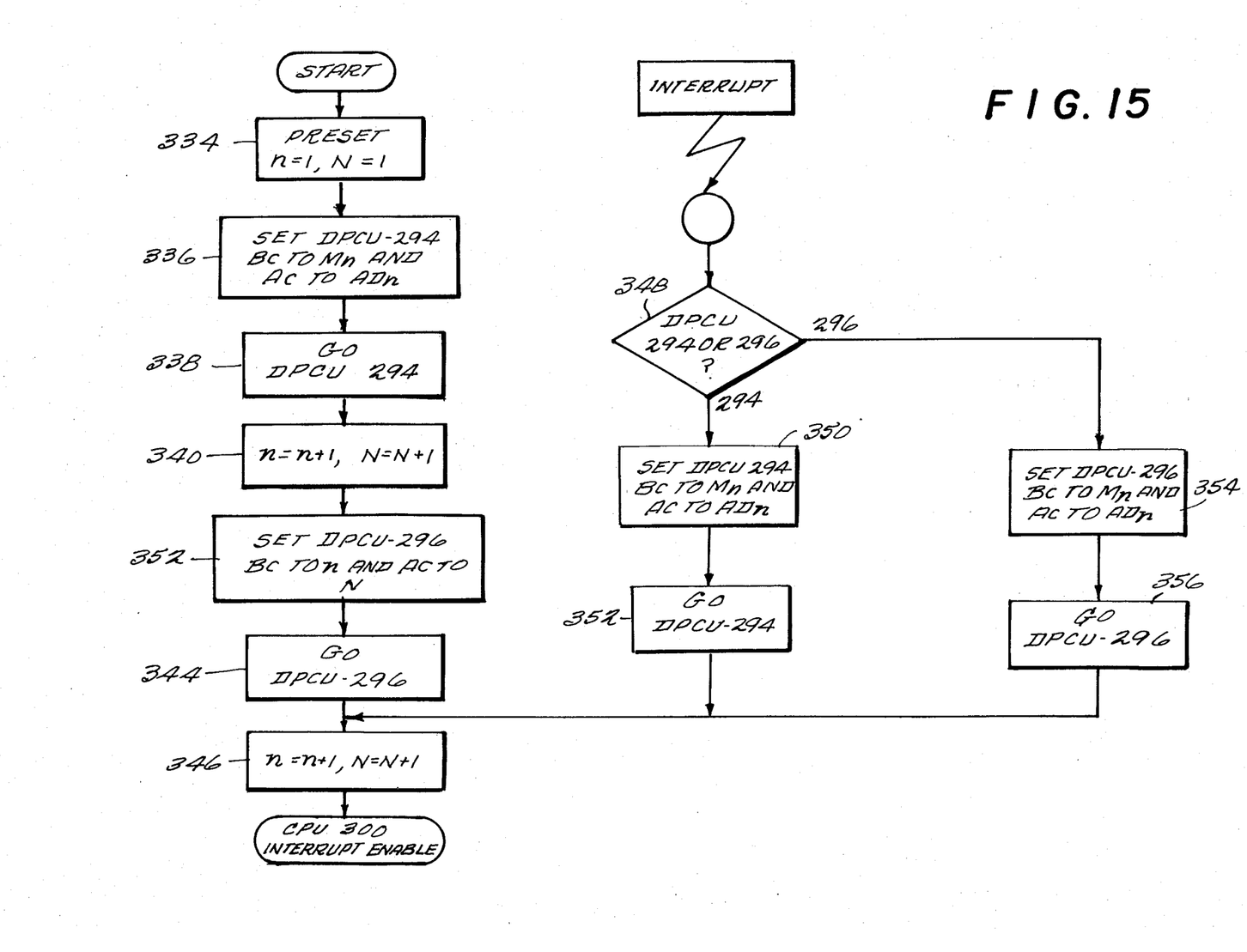
FIG. 15 is a flow chart explaining the operation of the CPU in FIG. 9.

FIG. 15 is a flow chart explaining the operational commands issued by CPU 300 to DPCU 294 and DPCU 296. In the Figure, the n-counter and N-counter in CPU 300 are preset to n=1 and N=1 at step 334 where, "n" and "N" indicate the suffix corresponding to cell memory "Mn" and address "AD$_N$". For this flow chart, each of cell memories 314-324 is considered as one of cell memories M1-M6, respectively. Then at step 336, registers BC and AC of DPCU 294 are set to Mn and AD$_N$, respectively. Next at step 338, a GO command, i.e., computation command, is issued to DPCU 294. At step 340, the n-counter and N-counter are incremented. Further at step 342, Mn and AD$_N$ corresponding to new n and N are stored in registers BC and AC of DPCU 296. At step 344 to GO command, i.e., a computation command, is issued to DPCU 296. At step 346, the n-counter and N-counter are incremented again. CPU 300 then waits for an interrupt.

When an interrupt command is received from DPCU 294-296, CPU 300 determines which DPCU has issued the interrupt command at step 348.

If the interrupt is that issued by DPCU 294, registers BC and AC of DPCU 294 are set to Mn and AD$_N$, respectively in step 350. Then, in step 352, a GO command is given to DPCU 294. If the interrupt is that issued by DPCU 296, registers BC and AC of DPCU 296 are set to Mn and AD$_N$, respectively in step 354. Then, in step 356, a GO command is given to DPCU 296. Then, n and N are incremented at step 346.

FIGS. 14 and 15 have been explained in relation to FIG. 11. However, cell memories corresponding to each cell data in FIG. 11 may be specified in any order as mentioned previously. The contents of the bank table BT of RCU are shown in another example in FIG. 12.

In the example of FIG. 9, each cell memory needs to be provided with input ports for WCU-BUS 326 and WCU-BUS 328. This situtation can be avoided by dividing the cell memories into two groups as shown in FIG. 16.

Figure 16:
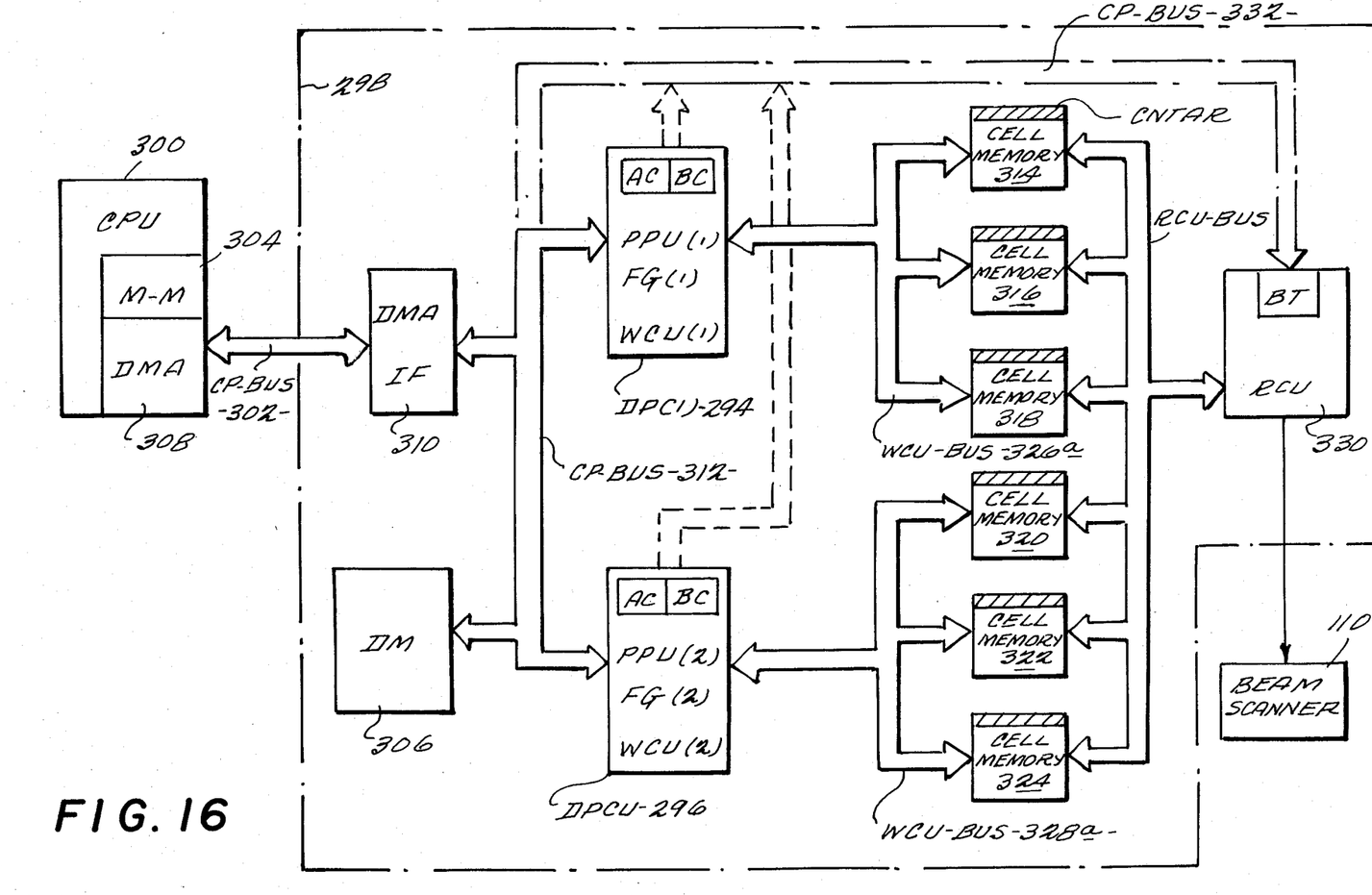
FIG. 16 is a block diagram of still another embodiment of the present invention related to the embodiment in FIG. 9.

Although FIGS. 9 and 16 show examples having two dot pattern converting units, faster drawing can be achieved by provision of more converting units and also more cell memories. As shown in FIG. 14, cell data 1-6 are associated with cell memories 314-324 before drawing has started, and in this case an arrangement may be made such that cell memories are specified by a six-stage counter instead of providing the bank table BT in RCU 330.

As described above, according to the present invention, provision of BT in RCU 330 makes possible the arbitrary specification of cell memories 314–324 even if conversion into dot pattern data takes different times depending on the amount of data in each cell. Moreover, according to the present invention, the control area in each cell memory may be given information about the subsequent cell memory by CPU 300. The RCU can determine the cell memory to be read next referring to information in the previous cell memory. In this case, information for the memory cell control area may be generated by the CCPU or by the DPCU itself (perhaps with the aid of the CPU). In this case, the bank table BT is not required, resulting advantageously in a simple system structure.

Furthermore, the present invention employs a plurality of dot pattern converting units which are designated in a multiplex fashion so as to be used for computation alternately. The resultant dot pattern data is stored in cell memories which are addressed in a sequential, random or combination fashion, and the read control unit RCU reads out dot pattern data stored in each dot pattern converting unit in the order of the cell memories. Thus, dot patterns may be read more quickly as compared with the conventional system, and the drawing speed can be enhanced.

It will be further understood by those skilled in the art that the foregoing are descriptions of preferred embodiments of the present invention and that various changes and modifications may be made in the embodiments without departing from the spirit and scope thereof as defined by the following claims.

What is claimed is:

1. An electron beam drawing control system comprising:
    first memory means for storing parametric data describing at least one of the size, location and shape of figures to be drawn;
    a plurality of dot pattern converting means for collectively reading out said parametric data sequentially from said first memory means and for generating dot pattern data corresponding to said figures, said plurality of converting means all operating simultaneously to simultaneously convert a plurality of said parametric data to dot pattern data so that said parametric data representing figures to be drawn is converted more quickly than if a single dot pattern converting means is employed;
    a plurality of second memroy means for storing dot pattern data generated by said plurality of dot pattern converting means in the same order as parametric data is read from said first memory means and converted by said plurality of converting means, a plurality of said second memory means being provided to enable said plurality of converting means to store dot pattern data without delay; and
    read control means for reading out said dot pattern data from said plurality of second memory means in the same order as said dot pattern data was stored in said second memory means, said plurality of converting means and said plurality of second memory means allowing the rate of data read out by said read control means to be greater than if a single converting means and single second memory means are employed.

2. An electron beam drawing control system as in claim 1, further comprising:
    a central processing unit which has a main memory storing a group of parametric data representing said figures;
    a control bus interconnecting said central processing unit, said plurality of dot pattern converting means and said read control means;
    direct memory access means for withdrawing data from said main memory;
    means for interconnecting said direct memory access means, said first memory means and said plurality of dot pattern converting means;
    read bus means for connecting said read control means and said plurality of said memory means; and
    write bus means for connecting said plurality of dot pattern converting means and said plurality of second memory means.

3. An electron beam drawing control system as in claim 2, wherein said write bus means comprises a plurality of buses, each of said buses being connected to one of said dot pattern converting means and a sub-group of said plurality of second memory means, respectively.

4. An electron beam drawing control system as in claim 2, wherein said read control means includes bank table means for storing information concerning the order in which data is stored in said plurality of second memory means so that said read control means can access appropriate ones of said plurality of second memory means in an appropriate sequence to read out dot pattern data in an order necessary to form said figures to be drawn.

5. An electron beam drawing control system as in claim 1, further comprising:
    a central processing unit which has a main memory storing a group of parametric data representing said figures;
    direct memory access means for withdrawing data from said main memory;
    CP bus means for connecting said direct memory access means and said first memory means;
    a plurality of parameter bus means, each for connecting said first memory means to one of said plurality of dot pattern converting means, respectively;
    a plurality of write bus means, each for connecting one of said dot pattern converting means to a sub-group of said plurality of second memory means; and
    read bus means for connecting said plurality of second memory means and said read control means.

6. An electron beam drawing control system as in claim 5, wherein said first memory means includes a plurality of data memories, each of said data memories being connected to said CP bus means and one of said plurality of parameter bus means.

7. An electron beam drawing control system as in claim 6, wherein each of said data memories, a corresponding one of said dot pattern data converting means and a corresponding one of said sub-groups of said second memory means are mounted on one printed circuit board which has connecting portions to said CP bus means and said read bus means.

8. An electron beam drawing control system which comprises:
    a controller unit provided with a first memory means for storing parametric data describing at least one of the size, location and shape of figures to be drawn;

second memory means for storing said parametric data;

data transfer means for transferring said parameter data from said first memory means to said second memory means;

a plurality of dot pattern data converting means for generating dot pattern data corresponding to figures in each of a plurality of cells by reading out said parametric data sequentially from said second memory means and converting said parametric data to said dot pattern data;

bus means for interconnecting said controller unit, said second memory means and said plurality of dot pattern data converting means;

said controller unit including means for giving a start address of said parametric data stored in said second memory means to one of said dot pattern data converting means when said one dot pattern data converting means issues a command in response to completion of conversion of all parametric data previously read from said second memory means, whereby said one converting means reads the corresponding parametric data from said second memory means in accordance with said start address, said controller unit supplying start addresses to said plurality of converting means so that all of said converting means are operating simultaneously to simultaneously convert a plurality of said parametric data into dot pattern data so that said parametric data representing figures to be drawn is converted more quickly than if a single dot pattern converting means is employed;

third memory means for storing dot pattern data for each cell generated by said dot pattern data converting means; and read control means for reading out said dot pattern data from said third memory means in serial form.

9. An electron beam drawing control system as in claim 8, wherein:
said third memory means includes a plurality of cell memories divided into subgroups; and
said system further comprises a write control bus connected between each of said cell memory subgroups and one of said dot pattern data converting means so that each of said dot pattern data converting means utilizes one of said cell memory subgroups.

10. An electron beam drawing control system as in claim 8, wherein:
said third memory means includes a plurality of cell memories;
each said dot pattern data converting means is provided with fourth memory means for storing cell memory designating information which specifies one of said cell memories; and
said read control means is provided with bank table memory means for storing sequentially cell memory designating information supplied from said controller unit to each of said fourth memory means in said each of said dot pattern data converting means, whereby said read control means reads said bank table memory means sequentially for designating cell memories so that said dot pattern data is read out from said third memory means in an order necessary to form said figures to be drawn.

11. An electron beam drawing control system as in claim 8, wherein:
said third memory means includes a plurality of cell memories;

each said dot pattern data converting means specifies one of said cell memories from which all dot pattern data has already been read out by said read control means at a time said converting means finishes the conversion for one cell, stores the result of said conversion corresponding to the subsequent cell in said one of said cell memories and supplies designating information related to said one cell memory to read control means sequentially; and said read control means is provided with bank table memory means for storing cell memory designating information given by each said dot pattern data converting means, said read control means using said cell memory designating information to read said dot pattern data in an order necessary to form said figures to be drawn.

12. An electron beam drawing control system as in claim 11, wherein:
said third memory means incldues a plurality of cell memories;
said plurality of dot pattern data converting means are connected to at least some of the same said cell memories; and
each said converting means determining one of said cell memories which has already had data read out and storing dot pattern data in said one cell memory.

13. An electron beam drawing control system as in claim 8, wherein:
said third memory means includes a plurality of cell memories; and
each of said cell memories includes means for storing cell memory designating information related to which of said cell memories is to be read by said read control means next.

14. An electron beam drawing control system as in claim 13, wherein said controller unit supplies each said dot pattern data converting means with the start address for said parameters of each cell, cell memory designating information for storing the conversion result of said parameters and the subsequent cell memory designating information indicating which of said cell memories is to be read next.

15. An electron beam drawing control system as in claim 8, wherein:
said third memory means includes a plurality of cell memories; and
said controller unit specifies for each said dot pattern converting means said start address and cell memory designating information indicating in which of said cell memories the conversion result for cell data corresponding to said start address is to be stored before starting an electron beam drawing operation and stores dot pattern data in all of said cell memories; and
said read control means is provided with a means for retaining the sequence of cell memories which has been specified by said controller before starting a drawing operation, whereby said read control means reads out said cell memories sequentially with reference to said retaining means after a drawing operation has started.

16. An electron beam drawing control system as in claim 15, wherein said retaining means comprises a counter which counts to a number equal to the number of said cell memories, said counter being incremented each time reading of one cell memory has been completed.

* * * * *